United States Patent [19]

Edele et al.

[11] Patent Number: 5,430,909
[45] Date of Patent: Jul. 11, 1995

[54] WIPER ARM INCLUDING A COATING FOR SUPPORTING A FLUID HOSE

[75] Inventors: Reinhard Edele, Sachsenheim; Reinhard Johannes, Eberstadt-Holzern; Oldrich Krizek, Bietigheim-Bissingen; Eckhardt Schmid, Brackenheim, all of Germany

[73] Assignee: SWF Auto Electric GmbH, Germany

[21] Appl. No.: 965,277

[22] PCT Filed: May 20, 1992

[86] PCT No.: PCT/EP92/01125

§ 371 Date: Jan. 22, 1993

§ 102(e) Date: Jan. 22, 1993

[87] PCT Pub. No.: WO92/21537

PCT Pub. Date: Dec. 10, 1992

[30] Foreign Application Priority Data

May 25, 1991 [DE] Germany .................. 41 17 106.3

[51] Int. Cl.6 .................... B60S 1/46; B60S 1/32
[52] U.S. Cl. ................... 15/250.35; 15/250.04; 248/74.2
[58] Field of Search ............ 15/250.01–250.04, 15/250.35, 250.31, 250.001; 248/74.2

[56] References Cited

U.S. PATENT DOCUMENTS 3,154,281 10/1964 Frank .................... 248/74.2

FOREIGN PATENT DOCUMENTS

| 2547548 | 12/1984 | France ............... 15/250.04 |
| 2610265 | 8/1988 | France ............... 15/250.04 |
| 2043822 | 3/1972 | Germany ............. 15/250.04 |
| 2756991 | 5/1979 | Germany . |
| 2942086 | 4/1981 | Germany ............. 15/250.04 |
| 3346304 | 7/1985 | Germany . |
| 3346384 | 7/1985 | Germany . |
| 8708171 | 10/1987 | Germany . |
| 3639537 | 6/1988 | Germany . |
| 3740639A1 | 6/1989 | Germany . |
| 58-177754 | 10/1983 | Japan . |
| 1198770 | 7/1970 | United Kingdom . |
| 1338325 | 11/1973 | United Kingdom ...... 248/74.2 |
| 1376738 | 12/1974 | United Kingdom ...... 248/74.2 |
| 1603589 | 11/1981 | United Kingdom . |
| WO9010561 | 9/1990 | WIPO . |

*Primary Examiner*—David A. Scherbel
*Assistant Examiner*—Gary K. Graham
*Attorney, Agent, or Firm*—Dykema Gossett

[57] ABSTRACT

A wiper arm with a wiper rod, at the one end of which a wiper blade is fixed.

The wiper rod is provided with a coating, onto which coating a hose channel is formed. Furthermore, it is possible to fix additional hose supports onto the wiper rod or onto the joint.

16 Claims, 5 Drawing Sheets

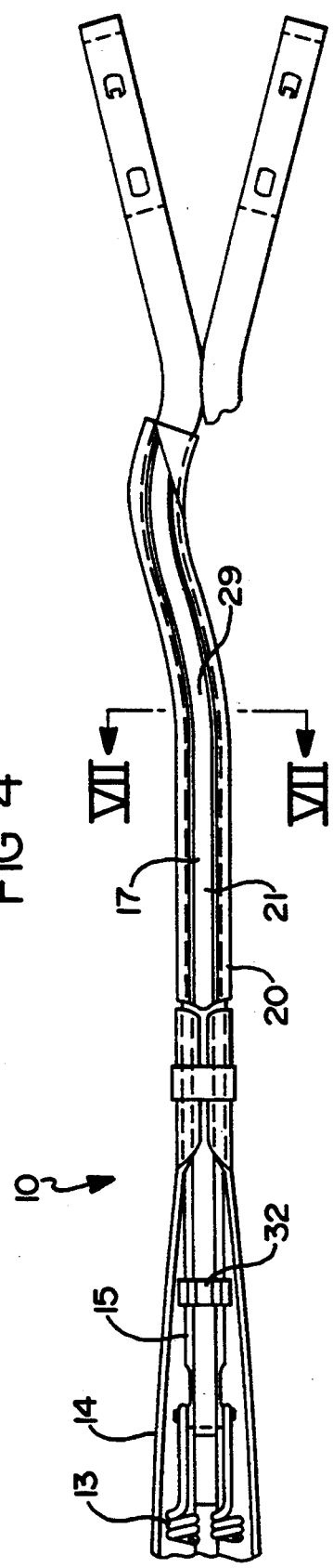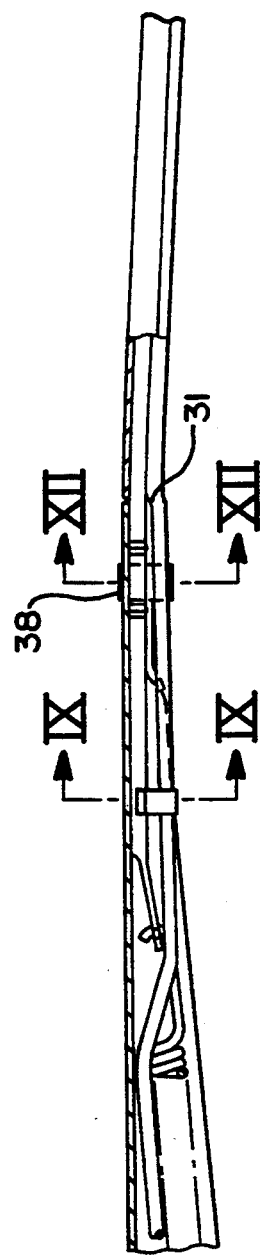

5,430,909

WIPER ARM INCLUDING A COATING FOR SUPPORTING A FLUID HOSE

BACKGROUND

The invention refers to a wiper arm that includes a coating along part of its length.

Such wiper arms with a coating which surrounds at least a part of the length of the wiper rod are known from DE-OS 3346 384. Here, the proposed coating fulfills the purpose offering a smooth surface on the wiper arm, especially on the wiper rod for a person looking at it. For this purpose, loose coatings as well as tightly fixed coatings are suggested.

Besides, it can be seen from above-mentioned specification, that a spraying facility is fastened onto the wiper arm, which ensures that the part of the windshield reached by the wiper blade is covered with washing liquid.

Furthermore, it is suggested to provide the coating with a bore which serves as pipe for the cleaning fluid. This kind of pipe for washing liquid is therefore advantageous, because there is a nozzle tip on the end of the bore. However, this embodiment is not useful at windshield or lamp washing systems, where a separate nozzle tip is provided.

SUMMARY OF THE INVENTION

The object of the invention is to create a wiper arm of such kind as mentioned at the beginning, which guides and secures the hose, and which resists the attacks of steam jet machines and brushes of a car washing system. On the other hand, it is an object of the invention to provide a wiper arm which allows the hose to be dismantled easily in case services are needed. The costs and the amount of separate parts additionally necessary, which support the hose, shall be as low as possible. Further, the coating is supposed to visually increase the value of the wiper arm and the hose guiding parts shall be as unobtrusive as possible. The hose shall be hidden as far as possible for a person looking at it from the outside.

This object is achieved by a wiper arm, which includes a coating along at least part of the wiper arm's length with the coating including a hose channel.

The proposed hose channel is formed onto the coating in order not to increase the amount of separate parts and to avoid assembly costs. The hose is guided safely along the whole length of the hose channel and can easily be taken out of the channel and can also be put back easily. No tools are necessary.

In part, the hose is completely hidden as viewed from the front and is hidden to a great extent, as viewed from a lateral point of view.

At another location of the wiper arm, there is an undercut only in the straight sections and not in the bent sections of the hose channel. This is advantageous for the spraying technique, as the flanges are flexible in their straight sections allowing the undercut to be removed; wherein the bent sections might be damaged, especially by cracks, if the flanges had to give way towards the outside during removal from the mold.

The invention also includes a coating around the wiper arm with an arm head. The arm head can be connected for example by crimping with the wiper rod.

The invention further includes a wiper arm with the arm head, where the arm head is fittingly connected with the wiper rod and where the bottom of the hose channel and the adjacent surface of the arm head, situated at the side of the windshield, lie approximately in one plane, in order to receive an almost straight guiding of the hose in this area.

Another object of the invention is a process for manufacturing the coating with hose channel. In the preferred embodiment the coating is manufactured from Ultradur, a trademark of BASF.

Further advantageous details and embodiments of the invention will be explained below by way of the attached drawings, in which

DESCRIPTION OF DRAWINGS

FIG. 4 shows a bottom view of the wiper arm of FIG. 3 with a push-on slip and a clip to support the hose.

FIG. 5 is partly a longitudinal section of a lateral view of a wiper arm according to the invention.

DETAILED DESCRIPTION OF THE DRAWINGS

Figure 1:
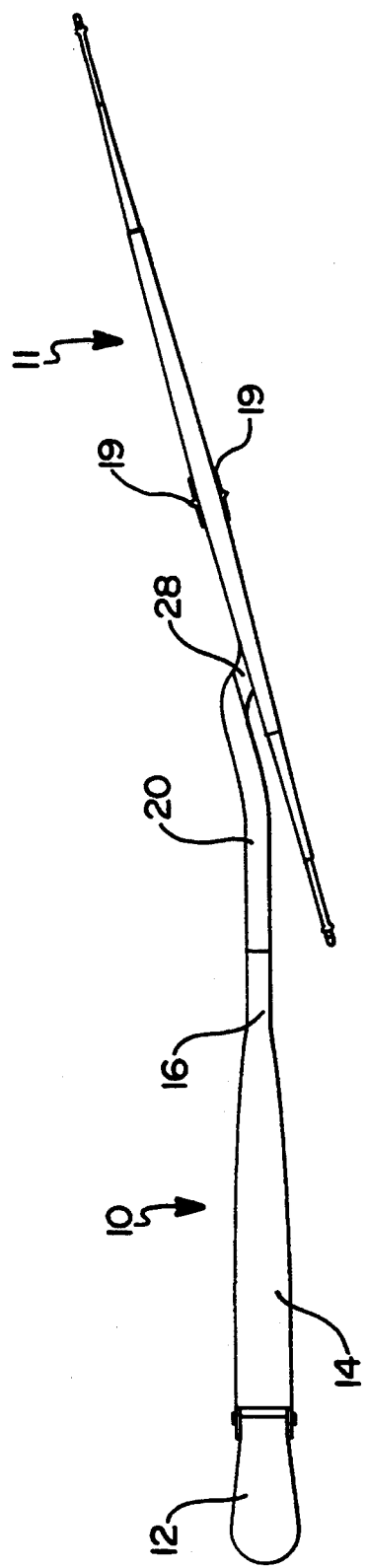
FIG. 1 shows a wiper arm with wiper blade and nozzles according to the invention.
Figure 2:
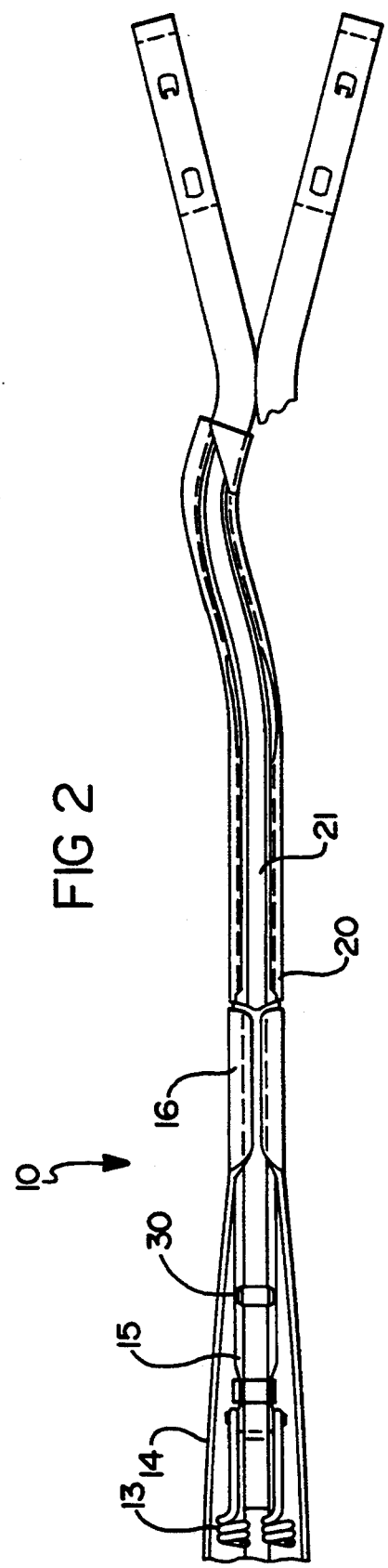
FIG. 2 shows a bottom view of the wiper arm with hose support, without wiper blade and without nozzle carrier.

The wiper arm 10 according to the invention, has a wiper rod 15 of an approximately rectangular cross section, consisting of a spring steel band. As shown in FIGS. 1 and 2, this wiper is covered by an arm head 14, from the side of its end connected with an attachment part 12, and by rod 15 a coating 20 along an opposite part of its length where the rod 15 grips a wiper blade 11 by means of a flattened part 28.

A hose channel 21 is formed by flanges 23, 24, 26 together with a bottom 25 of a hose channel 21. The width of the bottom of the channel 21 is greater than the height of the flanges 23, 24, 26 so that the wiper rod 15 has a low profile. As it can be best seen from FIGS. 2 and 4, hose channel 21 has a straight section 17, and a bent section 29. The flange 24 includes an end section which is curved towards the opposite flange, in order to support a hose 18. For this purpose the flange 23 is provided with an undercut 27 along the straight sections of the hose channel 21. The hose 18 includes a pair of fluid conduits 31 disposed in side-by-side relationship, and an essentially flat side which engages a corresponding flat area in the bottom of the hose channel 21.

Figure 7:
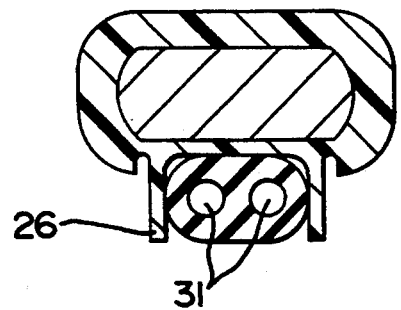
FIG. 7 shows a section taken along the line VII—VII in FIG. 4.

In order to ensure that the hose channel 21 can easily removed from the injection molding die, it is useful, however, to omit the undercut 27 at the bent sections of the flanges. Therefore, the flanges 26 are provided with straight walls in these sections (see FIG. 7). In order to be able to remove the flanges 23, 24 from the injection molding die, a rather high radial elasticity of the free flange ends is necessary. This elasticity is achieved and improved by making a cut 22. Thus it is sufficient that a cut or notch 22 is provided at least in the straight sections of the hose channel 21, because only there the flanges are provided with an undercut.

In order to obtain an attractive outward appearance of the wiper arm as viewed in the lateral direction (see for example FIG. 3 and FIG. 5) and on the other hand, to support and to guide the hose along the longest possible section, the flanges are formed along the whole length of the coating, if possible.

Figure 3:
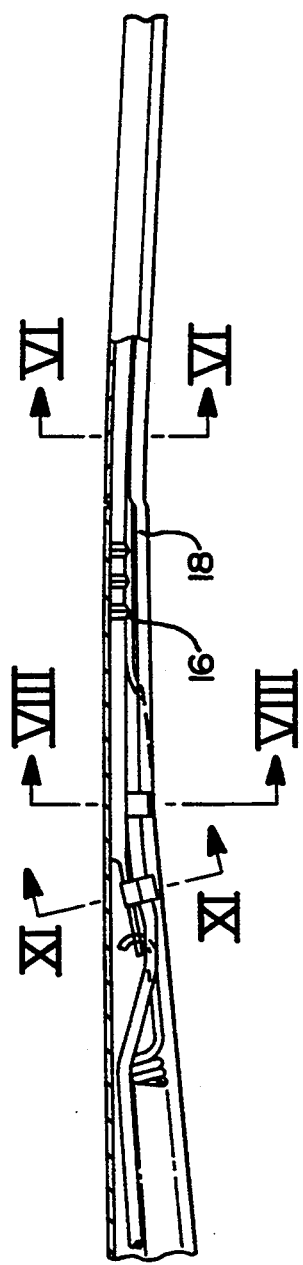
FIG. 3 is partly a longitudinal section, partly a lateral view of a wiper arm.
Figure 6:
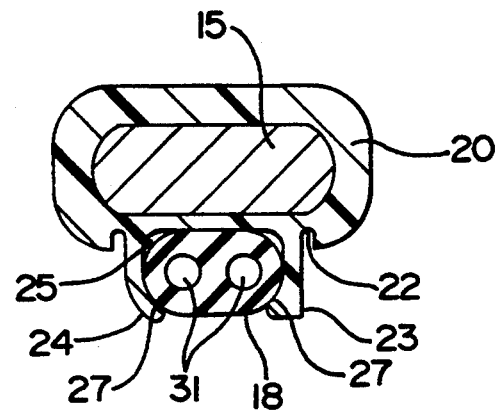
FIG. 6 shows a section taken along the line VI—VI in FIG. 3.

As it is shown in FIGS. 2 and 3, the hose 18 extends along the bottom side of the wiper arm 10 and namely from the arm head 14 of the wiper arm to the wiper rod 15 up to nozzles 19. Only in the area outside the arm head 14 is the wiper rod 15 provided with the coating 20 which forms the hose channel 21 on the bottom side of the wiper rod. This coating 20 is adjacent to the end of the arm head 14 which embraces the wiper rod 15.

In case of a different thickness of the bottom 25 of the hose channel and the arm head a step-line transition 31 appears in the area of the transition of the hose from the hose channel 21 to the surface of the arm head 14, surrounding the wiper rod 15 fittingly. There is an embracement 16 in the area of transition, which embracement is an area where arm head 14 is crimped around wiper rod 15, as it can be best seen from FIG. 2.

As far as the material of the arm head is thicker than the bottom of the hose channel 25 the hose might be squeezed by the edge of step-like transition 31 in case the undercut 27 extends in the cheeks 23 and 24 of the hose channel 21 up to the adjacent end of the arm head 14, that is until the step-like transition 31. This is avoided, if the undercut 27 does not run all the way to the end of the hose channel 21 situated at the side of the arm head, but ends a few millimeters before that. Thus the hose can get out of the hose channel at this point. Alternatively, the bottom 25 of the hose channel at least at the side of the arm head can be produced as thick as the arm head 14. Thus the undercut 27 can run up to the end of the hose channel 21 and the best possible guiding of the hose is achieved.

In order to guide the hose 18 safely outside the hose channel 21, further elements for fixing the hose are provided at the wiper arm, which can be seen from FIGS. 2-5 and FIGS. 8-12.

Figure 8:
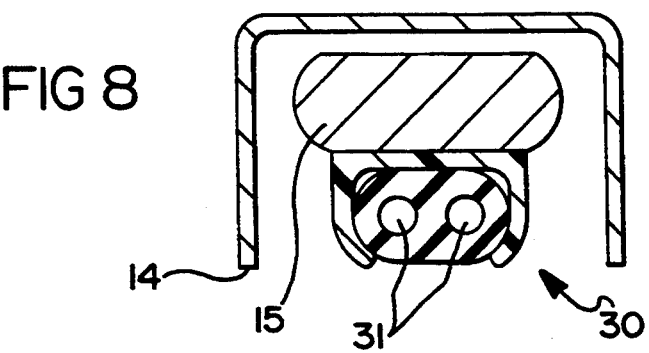
FIG. 8 shows a section taken along the line VIII—VIII in FIG. 3.

FIG. 8 shows a hose support 30, which is glued onto the wiper rod 15. It shows a cross section similar to the hose channel.

Figure 9:
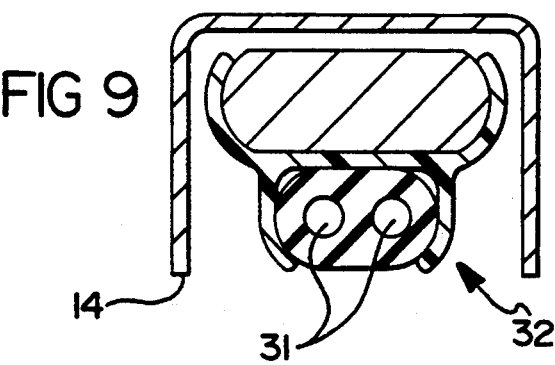
FIG. 9 shows a section taken along the line IX—IX in FIG. 5.
Figure 10:
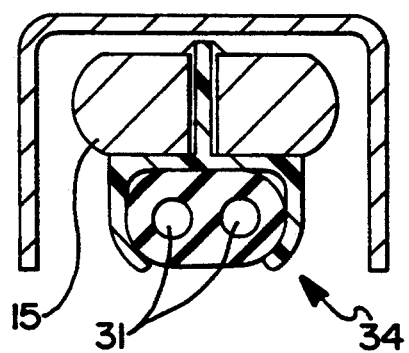
FIG. 10 shows a section of another wiper arm with a hose support provided with barbs, whereby the section is taken along the line IX—IX in FIG. 5.

FIG. 9 and FIG. 10 show further hose supports, whereby the hose support 32 according to FIG. 9 grips the wiper rod 15 clip-like and whereby the hose support 34 according to FIG. 10 is inserted into the wiper rod.

Figure 11:
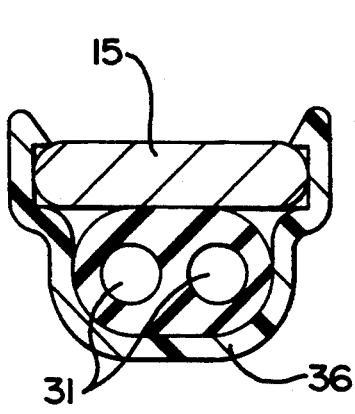
FIG. 11 shows a section taken along the line XI—XI in FIG. 3.

FIG. 11 shows a hose support 36, which surrounds the side of the wiper rod 15 turned away from the hose and which hose support holds itself at the wiper rod with its hook-like ends.

Figure 12:
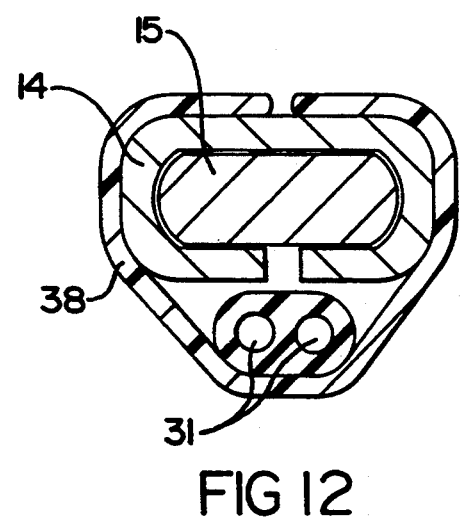
FIG. 12 shows a section taken along the line XII—XII in FIG. 5.

FIG. 12 shows a hose support 38, which keeps the hose 18 in a given position for the embracement.

The coating and hose channel are preferably manufactured from Ultradur, a trademark of BASF. In a preferred embodiment, the coating and hose channel are manufactured by injection molding and more preferably, are attached onto the wiper rod by injection molding. Further, the hose supports 30, 32, 34, 36 and 38 are preferably made by injection molding. In the manufacturing process, the wiper arm is painted and the paint is heat cured in, for example, a curing oven.

In principle it was always the aim to expand the coating and the hose channel along a longest possible section of the wiper rod, in order to realize a good appearance, on the one hand, and a reliable guiding of the hose, on the other hand.

What is claimed is:

1. A wiper arm having an elongated wiper rod encased within a coating along at least a portion of a longitudinal length of said wiper rod, said coating including a guide channel defined by opposed flanges extending outwardly from said coating and including a straight section and a curved section, said sections lying along a longitudinal length of the coating, said flanges being adapted to receive a washer tube for distributing washer fluid, each said flange having a varying profile along said longitudinal length of said coating, said varying profile being defined by an undercut in said flanges in said straight section of said coating, and said flanges being free of said undercut in said curved section of said coating, whereby to ensure retention of said washer tube with respect to said wiper arm.

2. The wiper arm of claim 1, wherein said undercut portion in said flanges defines an inwardly curved surface therealong, and said flanges in said straight section being generally straight therealong.

3. The wiper arm of claim 1, further including a plurality of connectors adapted to connect said tube to said wiper rod along the longitudinal length of said wiper rod at positions removed from said coating.

4. The wiper arm of claim 3, wherein at least one of said connectors includes a fastening member that is received within an aperture in said wiper rod.

5. The wiper arm of claim 1, wherein said coating encases said wiper rod and includes a bottom from which said channel extends, a top, and side portions, said bottom being thinner than the other portions of said coating.

6. The wiper arm of claim 1, wherein said coating is injection molded into said wiper rod.

7. A wiper arm adapted for use on a motor vehicle having a windshield, said wiper arm comprising:
an elongated wiper rod adapted at one end to receive a wiper blade and having a wiper hose, said wiper rod having an elongated coating with a face and side portions embracing said wiper rod and covering at least a face and side portions thereof along at least a part of its length, said coating being integrally provided with a hose channel for containing said wiper hose, said hose channel having a width and a height and being located on a back side of said coating and being formed by a bottom and a pair of opposing flanges, the width of said bottom being greater than the height of said flanges, whereby said hose channel possess a low profile wherein said hose channel has straight sections and bent sections lying along its longitudinal length and the flanges have an undercut in said straight sections of said hose channel and wherein said flanges are formed as straight walls without undercuts in said bent sections of said hose channel.

8. A wiper arm according to claim 7, wherein said coating completely surrounds a circumference of said wiper rod.

9. A wiper arm according to claim 7, wherein at least one of said flanges is bent on its end to form said undercut.

10. A wiper arm according to claim 7, wherein said coating is made with longitudinal cuts adjacent an intersection of said flanges and said coating and at least along said straight sections of said hose channel.

11. A wiper arm according to claim 7, wherein said wiper arm includes an elongated arm head having a predetermined thickness and an end situated adjacent said wiper rod and wherein said bottom of said hose channel has a thickness that is of approximately the same thickness as said arm head.

12. A wiper arm according to claim 7, wherein the coating with the hose channel are injection molded.

13. A wiper arm according to claim 7, wherein the coating with the hose channel is made from Ultradur.

14. A wiper arm according to claim 7, wherein said wiper arm includes an arm head with an embracement at an end thereof.

15. A wiper arm according to claim 14, wherein said wiper hose and said bottom include essentially flat portions engaging each other.

16. A wiper arm according to claim 15, wherein said wiper hose includes a pair of fluid conduits disposed in side-by-side relationship to each other.

* * * * *